United States Patent [19]

Lamberti et al.

[11] Patent Number: 5,377,103
[45] Date of Patent: * Dec. 27, 1994

[54] CONSTRAINED NATURAL LANGUAGE INTERFACE FOR A COMPUTER THAT EMPLOYS A BROWSE FUNCTION

[75] Inventors: Donna M. Lamberti, Medfield; John M. Prager, Sharon; Mark A. Nappari, Arlington, all of Mass.

[73] Assignee: International Business Machines Corporation, Armonk, N.Y.

[*] Notice: The portion of the term of this patent subsequent to Nov. 29, 2011 has been disclaimed.

[21] Appl. No.: 884,537

[22] Filed: May 15, 1992

[51] Int. Cl.5 .......................... G06F 15/38; G06G 7/60
[52] U.S. Cl. .................................. 364/419.08; 395/12; 395/600
[58] Field of Search ...................... 364/419.08; 395/10, 395/12, 63, 600

[56] References Cited

U.S. PATENT DOCUMENTS

| | | | |
|---|---|---|---|
| 4,638,445 | 1/1987 | Mattaboni | 364/424.01 |
| 4,670,848 | 6/1987 | Schramm | 395/600 |
| 4,688,195 | 8/1987 | Thompson et al. | 395/12 |
| 4,803,642 | 2/1988 | Muranaga | 395/62 |
| 4,811,199 | 3/1989 | Kuechler et al. | 395/600 |
| 4,914,590 | 4/1990 | Loatman et al. | 364/419.08 |
| 4,931,935 | 6/1990 | Ohira et al. | 364/419.08 |
| 4,967,368 | 10/1990 | Bolling et al. | 395/61 |
| 5,239,617 | 8/1993 | Gardner et al. | 395/12 |
| 5,255,386 | 10/1993 | Drager | 395/600 |

OTHER PUBLICATIONS

"Reason: An Intelligent User Assistant For Interactive Environments", Prager et al., IBM Systems Journal, vol. 29 No. 1, 1990, pp. 141-163.

"Knowledge and Natural Language Processing", Communications of the ACM, Aug., 1990, vol. 33, No. 8, pp. 50-71, Barnett et al.

"An Interface Architecture To Provide Adaptive Task-Specific Context for The User", Int'l Journal of Man-Machines Studies, 1989, vol. 30, pp. 303-327, Tyler et al.

"Pygmalian at the Interface", Communications of the ACM Jul. 1986, vol. 29, No. 7, pp. 599-604, Slater et al.

"A Note On Human Factors Issues of Natural Language Interactions With Database Systems", Information Systems, vol. 6, No. 2 pp. 125-129 (1981), Shneiderman.

*Primary Examiner*—Gail O. Hayes
*Assistant Examiner*—Stephen R. Tkacs
*Attorney, Agent, or Firm*—Perman & Green

[57] ABSTRACT

A computer includes a data/knowledge base with a plurality of entries and further employs a user/computer interface for responding to a natural language form input. The interface, in combination with the computer, provides a help function that includes a browse search capability that responds to the natural language-form input by responding with matching knowledge base data. The method includes the steps of: parsing a user's natural language input into a case frame structure; filtering the case frame structure into a goal-expression that comprises a verb and remaining syntactical portions of the natural language input; providing each data/knowledge base entry with a goal-expression data structure that indicates a functional characteristic of the data/knowledge base entry; comparing the goal-expression with the goal-expression data structures to determine a match or matches; and paraphrasing the found matching goal-expression data structure or structures into a natural language-form and communicating the paraphrase or paraphrases to the user.

5 Claims, 3 Drawing Sheets

CONSTRAINED NATURAL LANGUAGE INTERFACE FOR A COMPUTER THAT EMPLOYS A BROWSE FUNCTION

FIELD OF THE INVENTION

This invention relates to user/computer interfaces and, more particularly, to a natural language interface which provides a browse capability to enable a user to iteratively improve the constrained natural language input.

BACKGROUND OF THE INVENTION

Efforts are continually being expended to improve and simplify the user/computer interface. In this regard, substantial efforts have been expended in attempts to enable a user to employ a natural language as the interface medium. A natural language interface presents a number of problems, not the least of which is that complex characteristics of natural language cannot easily be mapped to data structures that a computer can interpret and respond to. Consequently, natural language interaction systems have traditionally suffered from a lack of clarity, insofar as understanding and response to instructions and queries are concerned. Given such a limitation, a user is often required to expend substantial effort interacting with a computer, in a trial and error mode, to shed some light on how to construct a natural language query to find out about the computer's knowledge. Traditional natural language systems have also been designed with the thought that the user would query the computer and the computer would respond without any feedback to assist the user in understanding the computer's internal representation of the knowledge and in such a way as to aid the user in restructuring the query.

Many sophisticated computers employ a help function to enable the user to overcome difficulties experienced in the course of operating the computer. One such help system which incorporates concepts, techniques and tools from the field of the artificial intelligence is described in "Reason: An Intelligent User Assistant For Interactive Environments" Prager et al., *IBM Systems Journal*, Vol. 29, No. 1, 1990, pages 141-163. The Reason interface enables a user to a query a computer system using a natural language input. It includes a parser, which produces a "case frame"-format syntactical analysis of the user's input query. The case frame analysis is then used to generate a goal-expression that is an internal data structure corresponding to the user input. The goal expression is employed in a search for an answer to the user's query, the goal expression being used solely as an internal-computer search vehicle.

In response to a natural language query, the Reason system searches its internal knowledge base for an answer to the query. In the course of the search, the goal-expression is matched to goal-expression data structures associated with entries in the knowledge base. When a match is found, inferencing rules are applied to the solution to create suggestions and explanations based upon the user's current context which are then sent back to the user's display terminal. In other words, Reason does not make a suggestion unless it is executable, given the current user's computing environment. The Reason interface does not include a capability to enable a user to "browse" through the knowledge base to determine a set of potential answers to a query regardless of current context. It further does not assist the user in restructuring the query so as to provide a more specific response from the knowledge base.

Copending U.S. Pat. No. 5,239,617, entitled "Method and Apparatus For Providing an Intelligent Help Explanation Paradigm Paralleling Computer User Activity" of Gardner et al., assigned to the same assignee as this application, describes certain aspects of the Reason interface.

Others have attempted to overcome the deficiencies of natural language query systems by using a menu-based natural language discourse as the mode of interaction. Such systems impose an artificial limit on the set of queries that can be constructed.

Others have explored ways of minimizing the computer's processing burden by requiring user inputs to be in a more constrained form of natural language. Results of such studies have found that such a form may be desirable, as well as more practicable for enhancing efficiency and satisfaction with the interface system.

Slater et al. in "Pygmalian at the Interface" Communications of the ACM, July 1986, vol. 29, No. 7, pages 599-604 describe a natural language interface wherein feedback is used to help the user acquire formal language skills in constructing queries for the system. As the interface described by Slater et al. is employed merely for the purpose of indicating that feedback could aid in enhancing user input skills, no relationship between the input language and internal computer data structures is described or considered.

Other prior art that considers human factors and natural language interfaces is as follows: Shneiderman, "A Note On Human Factors Issues of Natural Language Interactions With Database Systems", Information Systems, vol. 6, No 2. pages 125-129 (1981); Barnet et al., "Knowledge and Natural Language Processing", Communications of the ACM, August, 1990, vol. 33, No. 8, pages 50-71 and Tyler et al, "An Interface Architecture To Provide Adaptive Task-Specific Context For The User", International Journal of Man-Machines Studies, 1989, vol. 30, pages 303-327.

The patent prior art also shows various uses of natural language interfaces for computer systems. U.S. Pat. No. 4,914,590 to Loatmann et al., describes a system that understands natural language inputs. The system uses a syntactic parser to produce case frames for subsequent analysis. The Loatmann et al. system includes a browser function wherein windows are displayed including menus in which the user is enabled to select any displayed node within the system to be operated upon. Several types of browser windows are described, i.e., network windows which show a graph of part of the network defined by the system, and frame windows which graph an internal structure of individual objects. Loatmann et al. make no provision for feedback to the user of the natural language input to enable revision of the inputs or provide a broadly based browse function that enables multiple matches to be fed back for user analysis.

U.S. Pat. No. 4,688,195 to Thompson et al. describes a system for automatic generation of a set of menus that enables a user to access a database by selection of a natural language insert in the menu.

U.S. Pat. No. 4,670,848 to Schramm describes an interface system wherein a dialogue is provided with the user to clarify ambiguities in the user's natural-language input. The purpose of the dialogue is to narrow down the set of possible meanings of the user's input to a single one that may be appropriately responded to.

U.S. Pat. No. 4,967,368 to Bolling et al. describes a system that stores knowledge in a knowledge base of hierarchically defined terms and their definitions. When a user inputs a term, the system performs inferencing to traverse the hierarchy and provide a definition of the term.

U.S. Pat. No. 4,931,935 to Ohira et al. addresses the analysis of a natural language input on a word/clause basis by building a partial semantic/syntactic tree. This tree is constructed by evaluating, sequentially, the user's input. The system also predicts user input and displays it on the screen for future selection by the user.

U.S. Pat. No. 4,803,642 to Muranaga describers a method of searching for attributes of an object entered as an input. Internally, the object is described with an attribute name/attribute value. The inferencing process relates, via weights indicating semantic strength, the attribute that has the largest weight in describing an object. This attribute is then chosen for display.

U.S. Pat. No. 4,811,199 to Kuechler et al. describes a system for enabling an information based system to communicate with another subsystem in a computer through the use of a mapping technique.

Accordingly, it is an object of this invention to provide a user/computer natural language interface that enables a browse function.

It is another object of this invention to provide a user/computer interface that employs a natural language and a browse function and wherein the browse function provides a feedback of a paraphrased response to a user inquiry, which response is selectable by the user for further solution to the inquiry.

SUMMARY OF THE INVENTION

A computer includes a data/knowledge base with a plurality of entries and further employs a user/computer interface for responding to a natural language form input. The interface, in combination with the computer, provides a help function that includes a browse search capability that responds to the natural language-form input by responding with matching knowledge base data. The method includes the steps of: parsing a user's natural language input into a case frame structure; filtering the case frame structure into a goal-expression that comprises a verb and remaining syntactical portions of the natural language input; providing each data/knowledge base entry with a goal-expression data structure that indicates a functional characteristic of the data/knowledge base entry; comparing the goal-expression with the goal-expression data structures to determine a match or matches; and paraphrasing the found matching goal-expression data structure or structures into a natural language-form and communicating the paraphrase or paraphrases to the user.

DETAILED DESCRIPTION OF THE INVENTION

The invention provides a context-sensitive browsing capability for a computer wherein the computer uses a constrained natural language query input to search an internal "help" systems knowledge base for all instances of a match between a user query and an action or accompanying object represented in the knowledge base. The constrained natural language query syntax is based on the system's internal structure within the knowledge base, thereby enabling direct one-to-one matches. The format represents the user's query as a "goal-expression" that specifies a predicate or verb name, representing an action or goal, followed by arguments representing other direct or indirect objects involved in the action.

The browse function contemplated herein enables the user to have explicit control of the specificity of system output. During a browse process, a derived goal-expression is matched, dynamically, against all occurrences of like goal-expression data structures in the knowledge base. Matches are displayed to the user, even if they are not all valid solutions to the original query. More specifically, no action is taken to determine if the match is actually executable in the user's current environment. For instance, if a print action is required by the found match, the system reports the match even though no printer may actually be connected. When the responses are displayed, they are displayed in a constrained natural language paraphrase of a goal-expression so that, if the user wishes to access one or more, the precise input format is available and defines the user's further inquiry structure.

Figure 1:
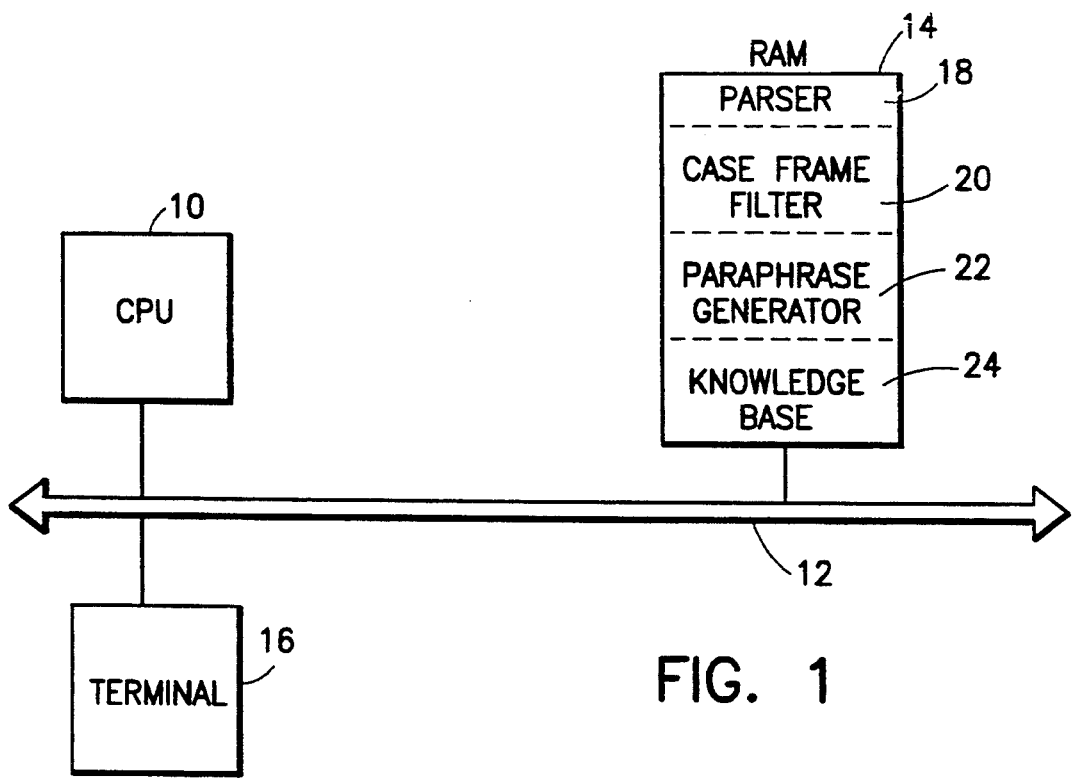
FIG. 1 is a high level block diagram of a computer adapted to perform the procedure of the invention.

In FIG. 1, a block diagram is shown of a computer system that is adapted to perform the method of the invention. The central processing unit 10 is connected via a bus or busses 12 to a random access memory and to a user interface terminal 16. Memory 14 contains a parser 18 whose function it is to syntactically analyze a user query/command entered through terminal 16. Parser 18 produces a case frame which segregates the syntactical portions of the user input into preestablished relationships and identifies them with corresponding role identifiers. The case frame is fed to a case frame filter 20 which eliminates the role identifiers and utilizes the segregated syntactical portions of the query/command to construct a goal-expression. The goal expression is paraphrased by a paraphrase generator 22 and is fed back to the user in a constrained natural language form to confirm that the computer "understands" the user's query/command.

A knowledge base 24 has a plurality of entries, each entry also including a goal-expression data structure that indicates a functional aspect of the entry. A matching of a goal expression generated from a user input to goal expression data structures is the main search technique used by this invention.

Assuming that a user at terminal 16 has requested a browse function, and has provided the computer with an input query, the resulting goal-expression is matched against all of the goal-expressions within knowledge base 24 and all of the matches are returned in goal-expression paraphrases for display on terminal 16.

Figure 2:
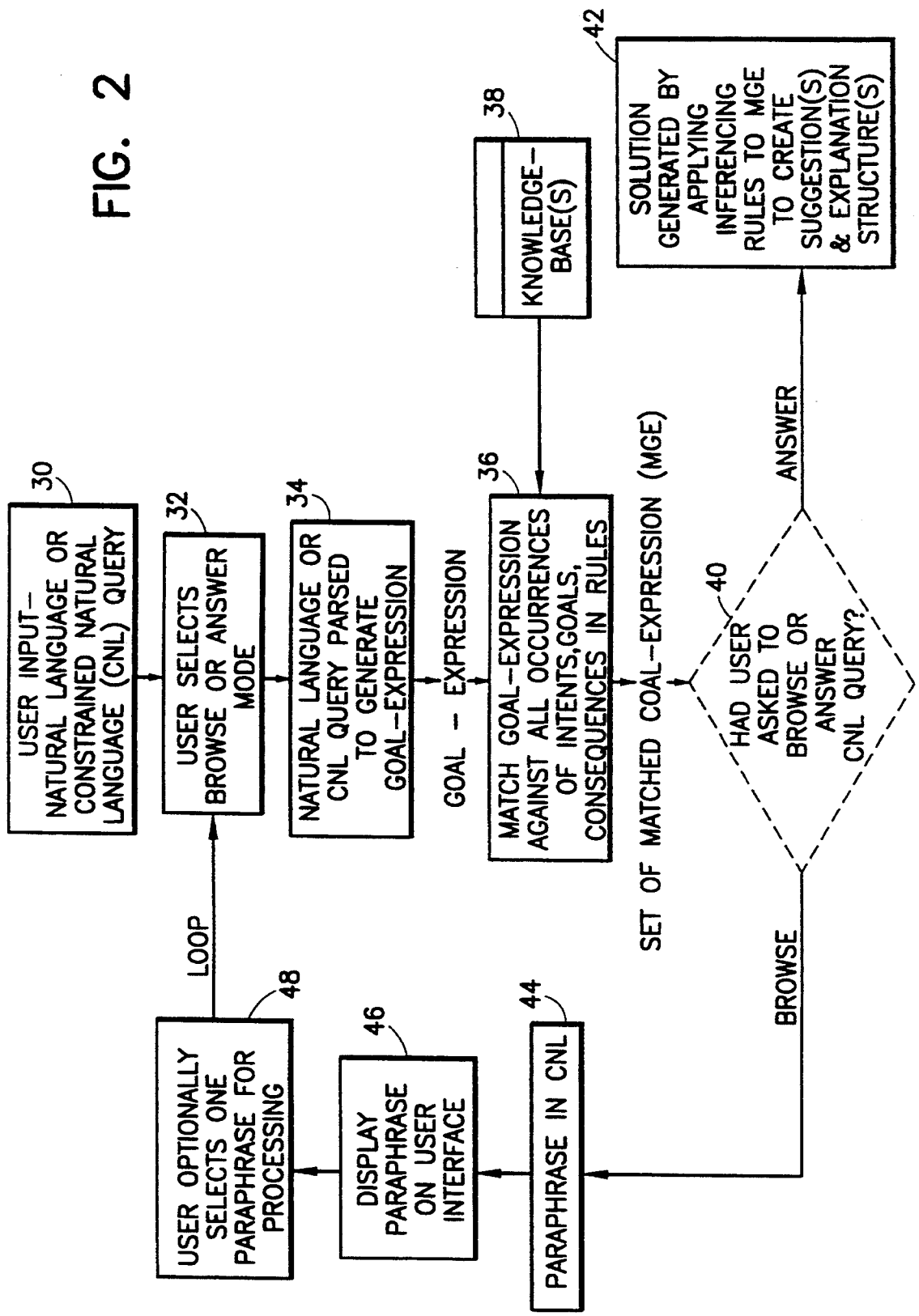
FIG. 2 is a flow diagram indicating the relationship of the major functions that combine to enable performance of the method of the invention.

A more detailed description of the invention is contained in the flow diagram of FIG. 2. A user input (box 30) takes the form of a natural language query or a constrained natural language (CNL) query. As will be hereinafter understood, a CNL query is essentially identical to a paraphrase of a goal-expression that is used by the computer in an internal search of its knowledge base for matches. Once the user's query is input, the user selects a "browse" or "answer" mode (box 32). The idea behind the "browse" option is to simply return first-level matches to the user without completing a solution process. This return tells the user, in essence, all the possible solutions to the query in ideal circumstances, without determining whether those circumstances actually hold. By contrast, the "answer" mode requires that, for a response to be made to the query, the circumstances in the user's current environment must be precisely as defined in the knowledge base before providing the response.

Assuming that the user selects the browse mode, the natural language or CNL query is parsed (box 34) to generate a goal-expression by parser 18 and case frame filter 20. The specific structure of a case frame and a goal-expression will be described below in relation to a given example. In the interim, however, assume the case frame is a data structure that starts with a verb extracted from the user query, followed by the subject, object and any modifiers included in the query. The resulting goal expression is then matched by CPU 10 (box 36) against all occurrences in a knowledge base 38 of identical data structures associated with various entries in the knowledge base. The knowledge-base constructs can be defined as follows:

Command-frames: represent predefined instructions in domains such as operating systems. While a command frame has many components, for the purpose of matching the input goal-expression, an intent list is used which is a list of goal-expression data structures representing the intent or purpose of the command.

Action-frames: describe the ways of interacting with a domain (e.g., operation system) other than via typing instructions. For the purpose of matching an input goal expression, an intent list is used which represents the intent of the action.

Goal-rules: describe intentions users typically have when in the domain, by breaking them down into simpler subgoals. Each goal-rule has a goal-expression that is a representation of the intent of the goal.

Consequence-rules are a form of deductive reasoning saying, in effect, if something is true or happens, then some other things are also true. For matching purposes, the consequence is structured identically to a goal-expression and is used.

Subsequent to a match action, a set of matched goal-expressions are determined and (decision box 40), if the user has invoked the browse mode, each of the matched goal-expressions is paraphrased into a CNL paraphrase (box 44). The CNL paraphrase action strips off any parentheses, commas, underscores and case identifiers and outputs the remaining terms in the order they appear. In essence, a compact paraphrase of the user query and any matching paraphrases from the knowledge base will be the result of the paraphrase action.

Assuming that the query is broadly drawn, the resulting paraphrases are fed to the user display (box 46) and are indicated thereon for user viewing. The user is then enabled to select one or more of the paraphrases for further processing (box 48) and the procedure recycles.

Had the user selected the answer mode, the procedure would have proceeded from decision box 40 to box 42 where one or more specific solutions would have been generated by applying inferencing rules to the matched goal expression to create both suggestions and/or explanation structures defining a further procedure to be followed.

Once the paraphrased goal-expressions are displayed for the user, the user can select a paraphrase for further solution. When the user selects a paraphrase, a new goal-expression is not generated, but rather, the same goal expression that resulted in the paraphrase chosen by the user is sent back to be solved by applying a set of inferencing rules as indicated in box 42.

Advantages associated with using a goal expression to generate the browse output and for enabling a user to select a goal expression paraphrase for problem solution are as follows. First, the goal expression which gave rise to the paraphrase is already generated, thus eliminating extra processing action. Second, this action reduces ambiguity as the specific goal-expression that was returned from a knowledge base entry is used as a query. Therefore, a direct access to the indicated knowledge base entry is assured. Third, there is always the possibility of making an error when generating a goal expression from a CNL input. By indicating the paraphrase and, as a result, using the same goal-expression that has already been generated, the potential for error is reduced.

Figure 4:
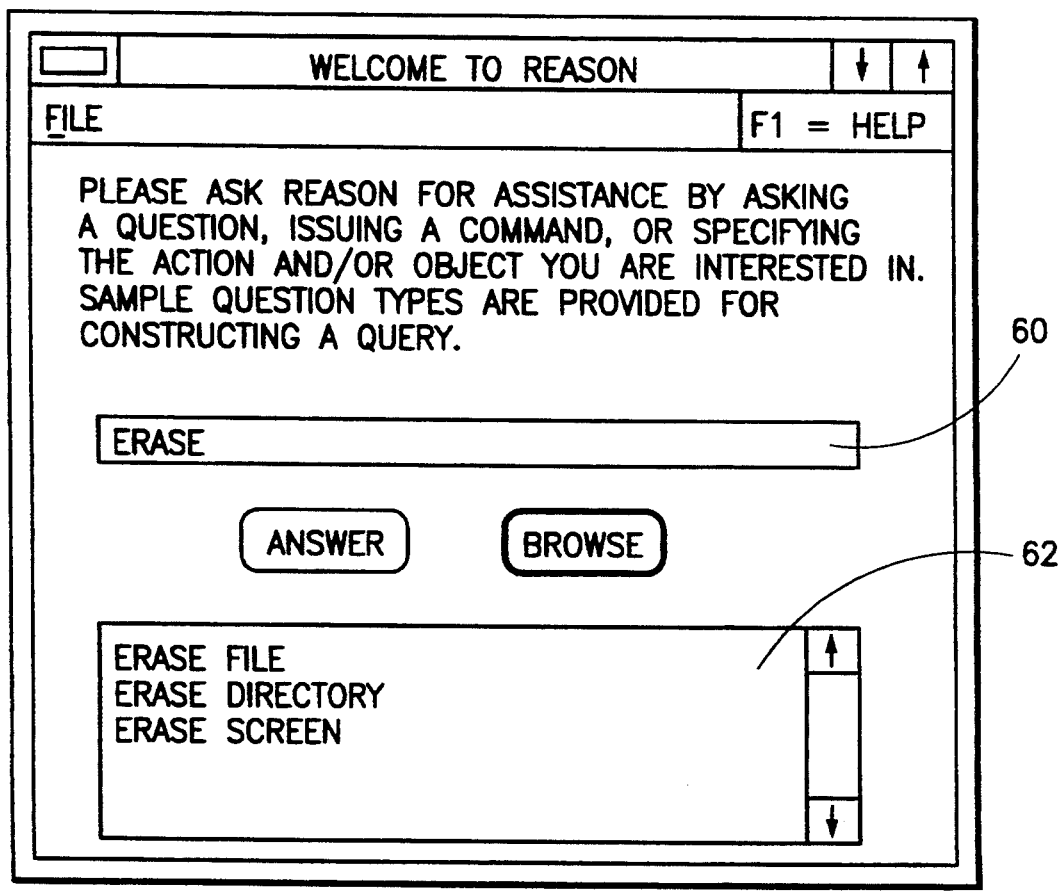
FIG. 4 is a representative screen presentation of a browse response to a user query.
Figure 3:
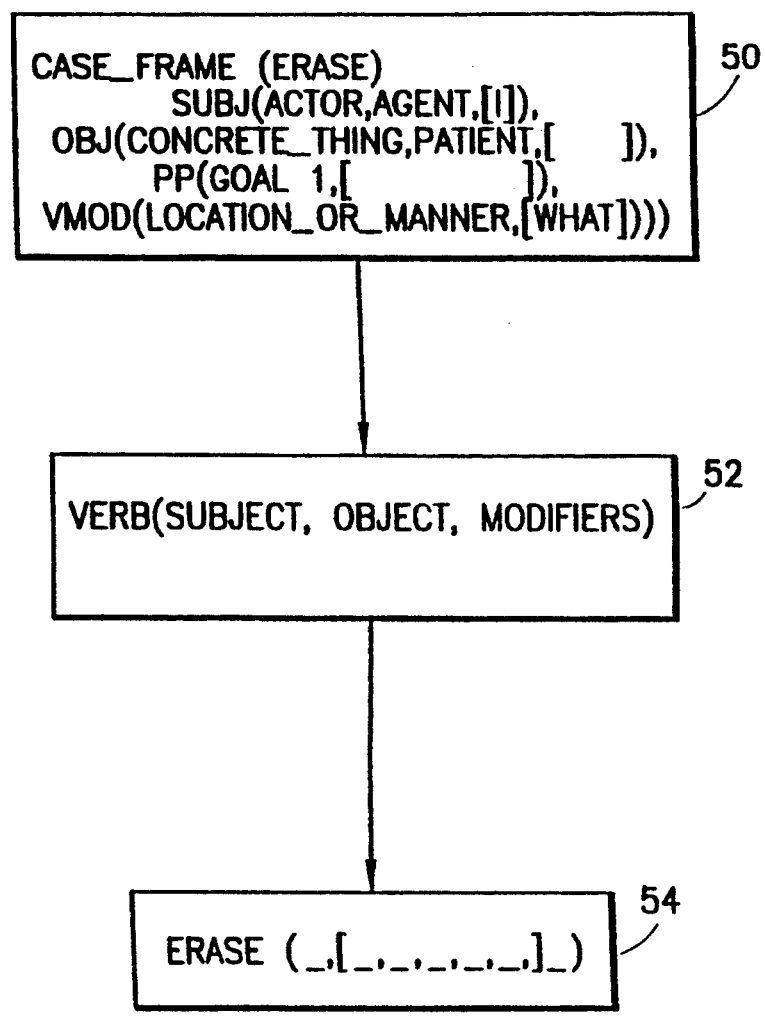
FIG. 3 is a schematic presentation of a case frame showing its conversion to a goal-expression.

Turning now to FIGS. 3 and 4, an example of a case frame to goal-expression generation will be described. In FIG. 3, a case frame 50 is illustrated that shows the various syntactical portions of a query "What can I erase". The first line of case frame 50 comprises an identifier "case-frame" followed by one or more elements in parentheses, separated by commas. In this instance, the first element is the verb "erase". The case frame analysis has further extracted the sentence's subject (subj) as the pronoun "I". As there is no object "obj" of the verb or any prepositional phrase "pp", those portions of the case frame are blank. The verb modifier "vmod" "what" is indicated on the last line of the case frame.

In the course of generating the case frame, case frame filter 20 (FIG. 1) further attaches identifiers to each of the syntactical portions of the user query. The subject and object are defined by "thing-type" and "role". In the example shown in FIG. 3, the subject is of a thing-type "actor" and is playing the role of "agent" for the verb "erase". Other thing-types that are possible are: concrete thing, software, etc. The list of thing-types is open-ended and may be configured by a user accordingly. Some of the "role" possibilities are: (a) agent: the performer of an action; (b) patient: the object which is the focus or theme of an action; (c) goal 1: end point of a transfer or destination; (d) goal 2: position where an object is made to appear; (e) recipient: actor that receives the object; and (f) source: the beginning point of transfer, a provider and origin.

Once the case frame has been derived, it is passed to a case frame filter 20 wherein a goal-expression is derived. The goal-expression is illustrated at 52 and comprises the verb of the query, followed by the query's subject, object and any modifiers. More specifically, the goal-expression consists of a predicate name, representing an action, and arguments representing an object's attributes involved in the action. Each object is represented by a five part list called an object-descriptor. Thus, the subject, object and modifier each have a multi-element list which further describes the respective object.

The object descriptor list includes the following: class, name, adjective, number, containing object. Each of those categories is as follows:

"Class" is what category an object falls into. For example, file XYZ is of class "file".

"Adjective" is a one word description of the object For example, in "last file" "last" is an adjective.

"Number" is a one word descriptor of the quantity of the object. For example, an object descriptor for "all files XYZ" would have an "all" in this field.

"Containing object" is another object descriptor representing an object which contains the first. This contemplates a complex phrase wherein one prepositional phrase is contained within another, for example "all of the files XYZ on directory ABC would be the full object descriptor.

Returning to FIG. 3, the broadly defined goal-expression 52 is converted by case frame filter 22 to a detailed goal-expression 54 for the exemplary query "what can I erase". The first entry into goal-expression 54 is the predicate name from the case frame, i e., "erase" in the example. The next slot (after the open parentheses) is for the subject and, the immediately succeeding slot (within the brackets) is for the object. If either the subject or object is absent, the corresponding slot has a "don't care" indication inserted. These characters may be underscores which function identically to the "anonymous variable in the programming language PROLOG. They will successfully match any content or another undescore in the corresponding positions when a goal expression is matched against a goal expression data structure in the knowledge base. If the subject is a pronoun (I or you, for example) the subject slot is filled with a "don't care" indication as the specific individual referred to is irrelevant to the desired solution.

Thus, the slot immediately after the verb "erase" has an underline inserted therein in lieu of the subject. Since there is no object in the case frame, the next five slots which make up the verb portion of the goal-expression are left blank with "don't care" inserts positioned therein. Finally, the verb modifier "what" is dropped as it is assumed by the query. For that reason, the verb modifier slot is filled with a "don't care" indication. Thus, it is seen that the CNL version of the phrase "what can I erase" is simply "erase".

Goal expression 54 is now employed in the search for matches within knowledge base 38 wherein certain identical goal-expression constructs will be found. The input goal-expression "erase" is matched against the intents of the command-frames for commands whose purpose can be represented with the action erase. Specifically, match is made with intents of the rd (remove directory) command which looks like, erase (__,[directory,__Name,__,__,__],__);

the erase command, which looks like, erase (__,[file,__Name,__,__,__],__);

and the cls (clear screen) command, which looks like, erase (__,[screen,__,active,__,__],__).

In this example, no goal-rule or consequence-rules are successfully matched against. An important point is that these matches do not constitute solutions. The key to the difference between browse and answer is that browse stops at this point in the processing. Whereas, in the answer mode, further validation has to take place to verify that the solutions given are valid, given the user's specific environment. In doing so, the system produces a solution by chaining through the framework of rules and frames, which are linked together by conditions and goal-expressions and applying a fixed set of axioms and strategy rules specifying the different ways that the system solves the current problem.

Turning now to FIG. 4, an exemplary screen display for the user is shown wherein the browse function has been chosen. In field 60, the user's paraphrased goal-expression "erase" is displayed. In field 62, matching goal-expressions from knowledge base 62 are displayed. To now select any such goal expressions, the user merely needs to indicate the specific paraphrase and the system immediately recovers the corresponding goal-expression and proceeds to the knowledge base, using the answer mode.

Let it be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. In a computer implemented user interface, for responding to natural language-form inputs, that includes a knowledge data base with a plurality of entries, said interface providing a help function that includes a search capability for responding to said natural language-form inputs by providing matching data from said knowledge data base, said interface performing a method comprising the steps of:

parsing a user's natural language input into a syntactical structure;

filtering said syntactical structure into a goal-expression data structure comprising a verb and syntactical portions of said natural language input;

providing knowledge data base entries with goal-expression data structures that indicate a functional characteristic of each said entry;

comparing said goal expression data structure with said goal expression data structures in said knowledge data base to determine a match or matches; and converting each said matching goal-expression data structure or structures into a constrained natural language-form and communicating said constrained natural language-form(s) to said user, said converting occurring for all matching goal expression data structures irrespective of whether any said matching goal expression data structure or structures are valid solutions that can be executed in the user's software and hardware environment, in response to said user's natural language input.

2. The method as recited in claim 1 further comprising the step of:

enabling said user to select a communicated constrained natural language-form, said selection causing said computer to employ the goal-expression data structure from which said selected constrained natural language-form was derived, to access said knowledge data base to determine a matching goal-expression that is executable in said user's software and hardware environment, in response to said user's natural language input.

3. The method as recited in claim 2, wherein said goal-expression includes components that comprise:
a verb, subject, object and modifiers, all as derived from said natural language input.

4. The method as recited in claim 1, wherein said converting step employs said goal-expression data structure to construct a constrained natural language-form response to the user, said converting step providing as said constrained natural language-form, only phrases derived from said user input and matching goal-expression data structures, while discarding all other portions of the goal expression data structures.

5. The method as recited in claim 4, wherein said comparing step ignores "don't care" symbols when providing an output indicative of a match of a goal-expression data structure that results from a user's natural language input and a goal-expression data structure stored in said knowledge data base.

* * * * *